United States Patent Office

3,342,263
Patented Sept. 19, 1967

3,342,263
METHOD AND COMPOSITION FOR TREATING
SUBTERRANEAN FORMATIONS
Paul W. Fischer, Whittier, Calif., assignor to Union Oil
Company of California, Los Angeles, Calif., a corporation of California
No Drawing. Filed May 12, 1965, Ser. No. 455,297
34 Claims. (Cl. 166—33)

ABSTRACT OF THE DISCLOSURE

This invention concerns the use of discrete solid particles of a slowly oil-soluble, homogeneous mixture of a polymer component and a halogenated aromatic hydrocarbon melting above about 120° F. in the treatment of subterranean formations penetrated by a well.

---

This invention relates to the treatment of subterranean formations penetrated by a well bore, and more particularly to a method of treating permeable subterranean formations wherein a novel particulate composition in fluid suspension is injected through the well bore and into the formation.

In its broadest aspect, the invention comprises the injection of a fluid suspension of solid particles of a homogeneous mixture of a polymer and a halogenated aromatic hydrocarbon melting above about 120° F. through a well bore and into a subterranean formation penetrated by the well bore. This solid particulate composition is insoluble in water and slowly soluble in hydrocarbon liquid rendering the material effective as a selective temporary plugging or diverting agent, as a fluid loss additive, as a temporary propping agent and as a propping agent spacer. Wax, or alcohol melting above about 120° F., can be included in the composition as an additional component of the homogeneous solid mixture. The improved technique of this invention is applicable to many important well treating processes utilized to increase the recovery of oil and gas from a hydrocarbon bearing formation, such as hydraulic fracturing, the injection of treating fluids into the formation, in secondary recovery operations, and in the completion of well bores drilled into hydrocarbon producing permeable formations.

Although high fluid permeability is a desirable characteristic of a hydrocarbon producing formation, many well drilling and treating operations are adversely affected when the well bore penetrates such highly permeable formations. The effectiveness and efficiency of these processes are substantially improved by plugging the more permeable structures to reduce the loss of drilling, fracturing and well treating fluids thereto. Accordingly, plugging techniques have been developed for injecting a variety of substances into such formations to reduce the formation permeability. However, most of these prior art plugging agents are either not easily removed and, if deposited in a hydrocarbon fluid producing zone, tend to effect permanent permeability loss causing decreased hydrocarbon production, or are generally inefficient in plugging the formation. A related problem is experienced in propping a fracture created by hydraulic pressure exerted upon the formation. Where permanent propping agents are employed, it is desirable that they be deposited as a monolayer of particles in spaced relationship within the fracture, since excessive propping agent deposition unduly restricts the permeability of the fracture. Spaced positioning can be achieved by co-depositing in the fracture a particulate mixture of permanent propping agent and soluble spacer. The spacer particles are dissolved by the formation fluids, leaving the permanent propping agent remaining in spaced relationship surrounded by flow channels formed upon removal of the spacer. The prior art does not teach a satisfactory spacer material for such application. Similar difficulty is experienced in adapting known materials to temporary propping of fractured formations.

In any of the aforesaid applications, it is essential that the temporary plugging or propping agent be readily removed from hydrocarbon producing zones to prevent permanent loss of permeability and attendant reduction in production rate. Removal may be effectively accomplished by utilizing a plugging agent which is soluble in the formation hydrocarbons. Most of the prior art materials, however, are either insoluble under bottom hole conditions or are so highly soluble that they are difficult to place in the formation and fail to maintain the required plug during the treating operation. It is therefore essential that the plugging agent possess the property of controlled solubility, wherein a satisfactory solid plug will be formed for a period of time, and whereupon the plug will be removed by being slowly dissolved by the well fluid. This solubility characteristic is also essential in a temporary propping agent or propping agent spacer. In treating an oil producing formation, it is usually advantageous to utilize a material which is insoluble in water, thereby leaving any water producing strata permanently sealed. Thus, a selective plugging is effected, the hydrocarbon producing strata being temporarily plugged and the water producing strata remaining permanently plugged. On removal of the temporary plugging or propping agent from the hydrocarbon producing strata, oil and gas production capability is fully restored while water production is permanently eliminated or substantially decreased.

Each of the aforesaid well treating processes commonly require a temporary plugging or propping material capable of being formed into small solid particles of controlled size, preferably by an inexpensive technique. The material should be slightly soluble in the well fluid at formation conditions, and insoluble in water, in order to accomplish the desired selective plugging and complete restoration of hydrocarbon production. The material is preferably non-tacky on exposure to air at ambient temperatures to avoid agglomeration of the solid particles. Similarly, the particles should not become tacky or sticky on exposure to formation hydrocarbons or to treating fluids. Particles which are somewhat resilient possess superior plugging properties, as they deform to effectively fill flow passages. High mechanical and impact strength is desirable to avoid size reduction of individual particles by attrition. The prior art materials used as plugging, propping and spacing agents generally do not possess the aforesaid properties and characteristics essential for effective and efficient selective temporary plugging and propping, and therefore, to a greater or less degree are unsuited for this purpose.

Accordingly it is an object of the present invention to provide an improved well treating process for temporarily plugging a permeable subterranean formation to prevent or retard the flow of fluids therethrough. Another object is to provide an improved process for fracturing oil bearing subterranean formations, and particularly for the multiple fracturing of such formations. Another object is to provide a process for fracturing a subterranean formation whereby a propping agent is deposited in the fracture in spaced relationship, thereby increasing the permeability of the fractured formation. Another object is to provide a temporary propping agent for the fracturing of relatively incompetent formations. A further object is to provide an effective lost circulation additive for addition to a well drilling fluid. A still further object is to provide a fluid loss additive to be added to a fluid placed in a well bore which will act to temporarily reduce the formation permeability without effecting a permanent reduction of the hydrocarbon permeability of the formation. Other objects and advantages of my invention will be apparent to those skilled in the art from the description thereof which follows.

I have found that the foregoing objects and their attendant advantages can be attained by treating subterranean formations with a particulate solid material made from homogeneous mixtures, or blends, of selected polymers and normally solid halogenated aromatic hydrocarbons melting above about 120° F. The compositions of this invention have variable solubilities and softening, or melting points, depending on the particular components of the compositions and the proportions of each present. Generally, the polymer component is a solid which is substantially insoluble at ambient temperatures in the hydrocarbon formation fluids and carrier fluids used to deliver these materials to the underground location. The halogenated aromatic hydrocarbon component is generally soluble in these fluids, even at ambient temperatures. Solid particles of the aforesaid polymer-halogenated aromatic hydrocarbon blends possess solubilities intermediate between those of the individual components. Thus, the particular blend used in each treatment can be selected depending on its melting point, softening point, solubility in the formation fluids, solubility in the carrier fluid, the ambient temperature, and the formation temperature.

The various specific components of the blend function to impart different properties to the final solid product. Specifically, the polymer adds strength to the product mixture not possessed by the soluble constituent alone. As previously mentioned, the halogenated aromatic hydrocarbon may be the only component in the mixture which is highly soluble in the formation fluids, and therefore imparts the solubility characteristic to the final solid product. Although all of the individual components of the mixture may not be truly soluble in the formation fluids, they nevertheless are dispersible into these fluids, and are removed from the formation as effectively as though they are truly soluble. Accordingly, it is the proportion of the oil-soluble solid halogenated aromatic hydrocarbon in the blend which largely controls the solubility of the final solid composition and imparts to it the particular characteristic of controlled solubility or dispersibility, which renders such compositions particularly useful as temporary plugging and propping agents.

The polymer component of my homogeneous particulate solid composition comprises (1) addition polymers of an olefin having between two and four carbon atoms in the monomer molecule, such as polyethylene, polypropylene and polybutylene; (2 copolymers of an olefin having between two and four carbon atoms and an alkyl acrylate containing not more than four carbon atoms in the alkyl group, such as esters formed by the reaction of acrylic acid and an alcohol having no more than four carbon atoms; (3 copolymers of an olefin having between two and four carbon atoms and esters formed by the reaction of butenic acid and an alcohol having no more than four carbon atoms; and (4) copolymers of an olefin having between two and four carbon atoms and an ester formed by the reaction of acetic acid and an unsaturated alcohol having no more than four carbon atoms. Preferred polymer component materials include polyethylene, polypropylene, polybutylene, copolymers of ethylene and vinyl acetate, and copolymers of ethylene and methyl methacrylate. Although the solid particle compositions of this invention may contain other polymeric materials, the term "polymer component" as used herein shall include materials selected from the aforesaid group of polymer and copolymer materials. A single polymer component, selected from the above classes of polymeric substances, may form the polymer component of my composition or two or more such materials may be combined in the blend. Each of the aforesaid polymer components will impart somewhat different properties of strength, ductility, solubility, melting point and density to the final solid composition. Desired properties not obtainable with a single polymeric material can often be achieved by blends of two or more of these polymers.

The second component of my composition is a normally solid halogenated aromatic hydrocarbon selected to impart the desired solubility characteristic to the final composition. It is essential that the treating composition remain solid under application conditions until dissolved or dispersed in the formation fluid. Although the treating composition must have a melting point above the maximum formation temperature, it can contain lower melting components. For example, the melting point of the halogenated aromatic hydrocarbon component can be substantially below formation or ambient temperatures, so long as the melting point of the polymer-halogenated aromatic hydrocarbon blend is above these temperatures.

Although in special applications, lower melting halogenated aromatic hydrocarbons can be employed, I have found that generally materials melting above about 120° F. form superior treating compositions possessing improved storage characteristics. While in the broadest sense any halogenated aromatic hydrocarbon melting above about 120° F. can be employed, I have found that certain halogenated aromatic hydrocarbons are preferred for the superior characteristics of solubility, strength and melting point imparted to the product mixture. These preferred materials include dihalobenzenes melting above about 120° F., monohalonaphthalenes melting above about 120° F., dihalonaphthalenes melting above about 120° F., trihalobenzenes melting above about 120° F., tetrahalobenzenes melting above about 120° F. and hexahalobenzenes. Various preferred halogenated aromatic hydrocarbons of the foregoing classes are listed in Table I. Of these materials, p-dichlorobenzene is especially preferred.

TABLE I.—*Preferred halogenated aromatic hydrocarbons*

| Name: | Melting point, °F. |
|---|---|
| 1. 1,4-dibromozenzene | 189 |
| 2. 1,4-dichlorobenzene | 127 |
| 3. 2-bromonaphthalene | 138 |
| 4. 2-chloronaphthalene | 133 |
| 5. 1,4-dibromonaphthalene | 180 |
| 6. 1,3-dichloronaphthalene | 143 |
| 7. 1,4-dichloronaphthalene | 154 |
| 8. 1,5-dichloronaphthalene | 225 |
| 9. 1,6-dichloronaphthalene | 120 |
| 10. 1,7-dichloronaphthalene | 146 |
| 11. 1,8-dichloronaphthalene | 190 |
| 12. 2,3-dichloronaphthalene | 248 |
| 13. 2,6-dichloronaphthalene | 276 |
| 14. 2,7-dichloronaphthalene | 237 |
| 15. 1,2,3-tribromobenzene | 190 |
| 16. 1,3,5-tribromobenzene | 247 |
| 17. 1,2,3-trichlorobenzene | 126 |
| 18. 1,3,5-trichlorobenzene | 146 |
| 19. 1,2,3,5-tetrabromobenzene | 209 |
| 20. 1,2,4,5-tetrabromobenzene | 354 |
| 21. 1,2,3,5-tetrachlorobenzene | 130 |
| 22. 1,2,4,5-tetrachlorobenzene | 282 |
| 23. Hexabromobenzene | 601 |
| 24. Hexachlorobenzene | 445 |
| 25. Naphthalene tetrachloride | 370 |

A particularly preferred material for admixture with a polymer component to form the composition of this invention is 1,4-dichlorobenzene (p-dichlorobenzene), a particularly preferred composition comprising copolymer polyethylene and methyl methacrylate in admixture with p-dichlorobenzene.

A superior treating composition can frequently be prepared by employing two or more of the aforesaid halogenated aromatic hydrocarbons melting above about 120° F. in admixture, particularly where these materials are selected from the preferred materials listed in Table I. Satisfactory compositions for many applications can frequently be more readily prepared with commercial grade mixed halogenated aromatic hydrocarbons at lower cost than possible with chemically pure ingredients.

Superior performance and lower cost can sometimes be achieved with a treating composition containing wax or solid alcohol as a third component. Suitable waxes include crystalline and microcrystalline petroleum waxes, as well as beeswax, carnauba wax, condellila wax, montan wax, and the like. Preferred for many of the uses of this invention are the paraffinic petroleum waxes comprising primarily straight chain hydrocarbons containing eighteen or more carbon atoms many of which have melting points between about 130° F. and about 165° F. A particularly preferred wax comprises fully refined petroleum paraffin crystalline wax having a melting point between about 130° F. and about 134° F. Solid alcohols having a melting point above about 120° F. are suitable for admixture with the polymer-halogenated aromatic hydrocarbon composition of this invention. Particularly preferred alcohols include monohydroxy aliphatic alcohols having molecular weights above about 240, such as 1-hexadecanol (cetyl alcohol), 1-heptadecanol (pri-n-heptadecyl alcohol), 1-octadecanol (stearyl alcohol) and 1-nonadecanol (nonadecyl alcohol).

The final blended product is readily prepared by melting the individual components and then combining the resulting liquids in the proper proportions. Alternatively, the solid ingredients can be combined in the proper proportion and then melted to achieve a homogeneous liquid mixture. In either case, the proportion of each component is selected to impart the previously disclosed important properties to the final solidified product. Generally, blend compositions suitable for treating subterranean formations contain between 10 and about 50 weight percent polymer component with the balance of the mixture composed of one or more of the aforesaid halogenated aromatic hydrocarbons. Thus, the compositions of this invention can contain as much as 90 weight percent halogenated aromatic hydrocarbon. Generally, higher halogenated aromatic hydrocarbon contents yield more soluble mixtures. Where a third component is employed, the previously described waxes and alcohols are usually added in an amount between about 5 and about 40 weight percent.

As previously disclosed, the composition must be formed into solid particles to be advantageously employed in the well treating processes described herein, and most preferably is formed into small spherical particles of substantially uniform size, the size depending on the particular treating application. The molten compositions of this invention are readily formable into solid particles of the desired size by several techniques such as prilling, dispersion, extrusion, etc., and the solid composition can be formed into particles by grinding, cutting, tearing, etc. One technique of manufacture employing the molten composition comprises violently agitating the molten composition within a body of non-solvent liquid, such as water, containing a finely divided solid, such as calcium carbonate. It is essential that the non-solvent liquid system not contain any material capable of forming solid colloidal dispersions or emulsions with the composition when violently agitated. The subdivided molten material, maintained in constant movement while cooling below the solidification point of the composition, usually assumes a somewhat spherical particle shape. Cooling or quenching of the subdivided particles can be carried out in any convenient manner, but usually comprises the introduction of large amounts of additional cool, non-solvent liquid to the subdivided particles dispersed in the original body of non-solvent liquid. Alternatively, ice may be added as a coolant to the non-solvent liquid.

A preferred technique for forming the blended liquid components into solid spherical particles comprises subdividing the molten blend by injection into a turbulently flowing stream of hot non-solvent liquid, such as water or the like, preferably heated to a temperature above the melting point of the blend, and solidifying the subdivided droplets in a relatively quiet reservoir of cooled non-solvent liquid. Injection of the blend into the moving non-solvent liquid stream is preferably made at an angle relative to the axis of the non-solvent liquid flow conduit, and preferably at a point on the bottom of the flow conduit. Thus, in a preferred method, the molten blend is injected upwardly into a stream of non-solvent liquid heated to a temperature above the melting point of the blend and turbulently flowing through a horizontal flow conduit, the blend being injected into the non-solvent liquid at an angle of less than 90 degrees from the axis of the non-solvent liquid flow conduit. The shear force of the turbulently flowing non-solvent fluid causes the injected blend to be subdivided into droplets of substantially uniform size determined in part by the non-solvent liquid flow velocity, blend injection rate, and the angle of injection. In the usual case, since the droplets are less dense than the non-solvent liquid, they rise when discharged into a relatively quiet reservoir, thereupon assuming a substantially spherical shape which is retained on solidification.

With the aforesaid preferred solidification process, the particle sizes may be rather closely controlled within a size range of from about 0.25 inch to about 0.006 inch, or approximately the size particles which will pass a number 3 U.S. Standard sieve and be retained on a number 100 U.S. Standard sieve. These particles are often suitably sized for use without further size separation, however, if desired the particles may be classified by any of the common size separation techniques.

In the broadest sense, my well treating process comprises injection through a well bore and into a subterranean formation of solid particles of the aforesaid composition as a suspension in a liquid carrier fluid. This treatment can comprise a single temporary and selective plugging step, or it may be an integral part of a comprehensive fracturing, well drilling, acidizing, or washing process.

The composition of my invention is particularly useful in the fracturing of subterranean formations, wherein solid particles thereof can be used as temporary pre-fracturing plugging agents, fluid loss additives, intermediate temporary plugging agents, temporary propping agents, and as propping agent spacers. When used as fluid loss additives, propping agents and spacers, the particles are suspended in the fracturing fluid injected into the well bore. Otherwise, the particles may be suspended in the fracturing fluid or in another fluid injected separately from the fracturing fluid.

In a typical fracturing application making full use of solid particles of my composition, an initial injection of particles is made to plug existing fractures and flow channels. The particle sizes selected for this pre-fracturing plugging step will depend on the expected nature and structure of the formation and the type of liner or casing employed. Typically, a particle size within the range passing a number 6 U.S. Standard sieve and being retained on a number 100 U.S. Standard sieve is used for plugging, and preferably a size within the range passing a number 6 and being retained on a number 20 U.S. Standard sieve. Injection of the plugging agent may be made as a suspension in a fluid containing up to about 12 pounds of solid particles per gallon of fluid. In suspension above about 12 pounds of solids, the solids become the continuous phase and the system loses its fluid characteristics. A preferred plugging agent suspension for pre-plugging prior to hydraulically fracturing comprises a suspension of between about 4 and about 8 pounds of particles per gallon of fracturing fluid.

A highly satisfactory general purpose plugging agent comprises a suspension of solid substantially spherical-shaped particles of the aforesaid composition, the particles having a size distribution wherein between about 30 to 50 weight percent of the particles are within the size range passing a number 6 and being retained on a number 20 U.S. Standard sieve, between about 10 and about 20 weight percent of the particles are within the size range passing a number 20 and being retained on a number 40 U.S. Standard sieve, between about 20 to 30 weight percent of the particles are within the size range passing a number 40 and being retained on a number 60 U.S. Standard sieve, and between about 10 and about 20 weight percent of the particles are within the size range passing a number 60 and being retained on a number 100 U.S. Standard sieve.

Fracturing is accomplished by injecting a fracturing fluid into the well bore at a relatively high volume flow rate and at a relatively high pressure until sufficient force is exerted on the subterranean formation to start a fracture therein. This initial injection of fracturing fluid is known as a spearhead injection and usually does not contain propping material, although fluid loss additives may be added. Smaller size particles are usually preferred for fluid loss additives, these particles usually being smaller than about number 20 U.S. Standard sieve size and preferably within a size range which will pass a number 20 and be retained on a number 100 U.S. Standard sieve.

A fracture opened by hydraulic pressure must be held open when the hydraulic pressure is removed to effectively improve formation permeability. In practice this is accomplished by injecting a solid propping agent into the fracture prior to release of the hydraulic pressure. However, deposition of these solids in the fracture tends to reduce permeability and to decrease flow through the fracture. Preferably, the propping agent is deposited in the fracture as a monolayer of particles in spaced relationship, the distance of the spacing being sufficiently close to provide support for the overburden without crushing the propping material, yet far enough apart to provide flow channels therearound.

On completion of the spearhead injection, propping agent injection is started by suspending a suitable permanent or temporary propping agent in the fracturing fluid injected into the well bore. Typical permanent propping agents which may be used include small solid particles of sand, glass beads, crushed walnut shells and like material. Preferred temporary propping agents are solid particles of the aforesaid polymer-halogenated aromatic hydrocarbon composition. The propping agent injection is usually started at an initial rate of about ½ pound of propping agent per gallon of fluid, and increased to a final injection not exceeding about 12 pounds per gallon and usually not exceeding about 8 or 9 pounds of solids per gallon. The injection of a high volume flow of fracturing fluid at high pressures is continued during this step and accomplishes extension of the initially formed fracture and deposition of the propping material therein. Fracturing fluid flow rates of about 60 to about 100 barrels per minute and pressures up to about 3000 p.s.i.g. are frequently required to accomplish fracturing by this method.

Superior results are often achieved by depositing a mixture of selected solid particles of my composition and a permanent propping agent in the fracture. The temporary propping agent is dissolved in the formation fluid leaving the permanent propping agent deposited in spaced relationship, thereby substantially increasing the permeability of the fracture. Where such spacers are used, they are preferably of the same size distribution as the permanent propping agent and are preferably added in sufficient quantity to achieve permeability without sufficient loss of support as to permit collapse of the fracture. Usually not more than about 50 volume percent of temporary propping agent can be used in this manner, i.e., a mixture of not more than approximately 50 volume percent of temporary propping agent and at least about 50 volume percent of permanent propping agent.

Where multiple fractures are desired, it is usually necessary to deposit a temporary plug in previously formed fractures before sufficient hydraulic pressure can be generated to cause subsequent fracturing. Solid particles of the composition of this invention can be used to temporarily seal the fracture during subsequent fracturing steps. These particles are deposited in the fracture as a suspension in the fracturing, or other liquid carrier fluid, in a manner similar to that previously described. Upon completion of the fracturing process the well is returned to production and the temporary plugging and propping agents are slowly dissolved by the formation hydrocarbon fluids, in this manner being essentially completely removed.

Many formations are sufficiently hard to be susceptible to fracturing, but are not hard enough to prevent resealing of the propped fracture under the load of high overburden pressures when conventional permanent propping agents are employed. In such cases fracture permeability may be achieved by depositing a temporary propping agent in the fracture, the incompetent formation closing around the individual particles of propping material on release of the hydraulic fracturing pressure. The propping agent is then dissolved by the formation fluid to provide a honeycomb-type structure along the fracture plane, thereby increasing the formation permeability.

The need for the temporary plugging of permeable formations is not limited to hydraulic fracturing, but can arise in many well treating processes wherein a fluid is injected into a well bore, such as encountered in acidizing, washing, etc. In each of these processes, the treatment may be ineffective, or inefficient, because of the loss of large quantities of the liquid treating fluid into the permeable formation. In such applications, it is highly desirable to temporarily plug or seal flow passages into the formation, thereby achieving better utilization of the fluid.

Similar problems are experienced in drilling a well bore into a permeable formation as the drilling fluid tends to flow into the formation rather than returning to the surface. The permeability can be sufficiently high that the entire fluid stream passes into the formation, thus resulting in loss of fluid circulation. In some cases the drilling fluid comprises a clay suspension, or mud, which will effect plugging of the permeable formation, thereby accomplishing restoration of the fluid circulation. Various fibrous and granulated materials, such as shredded or granular particles of asbestos, mica, plastics, cotton fibers, cellophone flakes, chopped rope, and like materials, known as lost circulation additives, may be added to the drilling fluid to promote plugging of fissures and cracks, thus reducing the formation permeability and minimizing drilling fluid loss. While such materials are generally satisfactory in preventing drilling fluid loss when drilling through non-productive zones, a hydrocarbon-producing zone can be permanently damaged by the entry of drilling fluid thereinto, particularly where the fluid is the suspended clay type, or contains the aforesaid lost circulation additives, as the plug formed therein is permanent and the sealing materials either prevent subsequent oil and gas production, or at least reduce production substantially. Mechanical techniques often used to remove drilling mud and lost circulation additives from the well bore wall may effect partial restoration, but such techniques are not highly successful, particularly where the fluid has penetrated into the formation. It is highly desirable that the completion of a well in a permeable hydrocarbon-producing zone be made without permanently plugging the formation. Hence, the ultimate well productivity may be greatly improved by the use of an effective temporary plugging agent to seal the formation when drilling into the productive zone.

A suitable drilling fluid for completion of a well bore in a permeable hydrocarbon-producing formation comprises a suspension of the polymer-halogenated aromatic hydrocarbon particles of this invention in a pumpable non-solvent carrier fluid. Conventionally, the drilling fluid is circulated from the surface to the drilling zone and returned to the surface. A portion of the particles suspended in the drilling fluid are deposited in formation flow channels thereby preventing or restricting the entry of substantial quantities of drilling fluid into the formation. The circulating drilling fluid also conventionally serves to cool the drill bit and to carry cuttings from the drilling zone to the surface. A preferred drilling fluid comprises a suspension of between about ½ and about 8 pounds of solid particles per gallon of carrier fluid, the particles being within a size range which will pass a number 6 and be retained on a number 100 U.S. Standard sieve.

The following examples are illustrative of my invention, but are not intended as limitations thereof:

EXAMPLE I

A 30 weight percent polymer-70 weight percent halogenated aromatic hydrocarbon composition is prepared and formed into substantially spherically-shaped particles by the conventional dispersion method. The polymer component is copolymer ethylene and methyl methacrylate. The halogenated aromatic hydrocarbon component is p-dichlorobenzene (1,4-dichlorobenzene).

The composition is prepared by melting approximately 30 grams of the polymer and 70 grams of p-dichlorobenzene in separate glass beakers. A homogeneous liquid component blend is formed by slowly combining the liquified ingredients while heating and gently stirring. Approximately 50 grams of the resulting homogeneous liquid mixture was then slowly added to a violently agitated aqueous hot calcium carbonate suspension contained in a Waring blender. The calcium carbonate suspension is a mixture of about 50 grams of finely-divided calcium carbonate in approximately 1000 ml. of water heated to a temperature of 200° F. Agitation is continued for about 4 minutes and then ice is added to cool the liquid to a temperature below the solidification temperature of the blend. The solid particles formed thereby are recovered by straining through a number 100 U.S. Series sieve.

The recovered solid particles are of substantially spherical shape and uniform size, having a melting point of 142° F. and being slowly soluble in liquid hydrocarbon.

EXAMPLE II

A three component polymer-halogenated aromatic hydrocarbon-wax composition is prepared according to the method of Example I using approximately 30 grams of copolymer polyethylene and methyl methacrylate, 35 grams of p-dichlorobenzene, and 35 grams of refined paraffin wax having a melting point of 165° F. as starting materials. The product composition has a melting point of 149° F.

EXAMPLE III

A three component polymer-halogenated hydrocarbon-alcohol composition is prepared according to the method of Example II using approximately 30 grams of copolymer polyethylene and methyl methacrylate, 35 grams of p-dichlorobenzene and 35 grams of commercial stearyl alcohol having a composition of approximately 24 weight percent cetyl alcohol, 69 weight percent stearyl alcohol and 7 weight percent l-eicosanol. The product composition has a melting point of 139° F.

EXAMPLE IV

An oil well treating composition is prepared by suspending solid particles of a polymer-halogenated aromatic hydrocarbon composition in a 39 gravity lease crude. The solid particles are a homogeneous mixture of 15 weight percent copolymer ethylene and vinyl acetate and 85 weight percent 1,4-dichloronaphthalene formed into solid, substantially spherical-shaped particles within the size range which will pass a number 6 U.S. Standard sieve and be retained on a number 20 U.S. Standard sieve. The particles are added to the carrier fluid in the proportion of 5.4 pounds of particles per gallon of fluid.

Various embodiments and modifications of this invention are apparent from the foregoing description and examples and further variations of composition and application will be apparent to those skilled in the art. Such modifications and changes are included within the scope of this invention as defined in the following claims:

I claim:

1. A method of treating subterranean formations penetrated by a well bore comprising the step of injecting through said well bore and into said formation particles of a homogeneous solid mixture comprising a polymer component and a halogenated aromatic hydrocarbon melting above about 120° F.

2. The method defined in claim 1 wherein the polymer component content of said solid mixture is between about 10 and about 50 weight percent.

3. The method defined in claim 1 wherein the polymer component is selected from the group consisting of (1) addition polymers of an olefin having between two and four carbon atoms, (2) copolymers of an olefin having between two and four carbon atoms and an alkyl acrylate containing not more than four carbon atoms in the alkyl group, (3) copolymers of an olefin having between two and four carbon atoms and an ester formed by the reaction of butenic acid and an alcohol having no more than four carbon atoms, and (4) copolymers of olefins having between two and four carbon atoms and an ester formed by the reaction of acetic acid and an unsaturated alcohol having no more than four carbon atoms.

4. The method defined in claim 1 wherein said polymer component is selected from the group consisting of polyethylene, polypropylene, polybutylene, copolymer ethylene and vinyl acetate, and copolymer ethylene and methyl methacrylate.

5. The method defined in claim 4 wherein said polymer component is a mixture of at least two materials selected from said group.

6. The method defined in claim 1 wherein said halogenated aromatic hydrocarbon is selected from those materials listed in Table 1.

7. The method defined in claim 1 wherein said halogenated aromatic hydrocarbon is p-dichlorobenzene.

8. The method defined in claim 1 wherein said particles are substantially spherical in shape.

9. The method defined in claim 1 wherein said particles are within the size range passing a number 6 and being retained on a number 100 U.S. Standard sieve.

10. The method defined in claim 1 wherein said particles are injected into said well bore as a suspension in a carrier liquid and wherein said suspension contains between about ½ pound and about 12 pounds of solid particles per gallon of said carrier liquid.

11. The method defined in claim 1 wherein said homogeneous solid mixture contains between about 5 and about 40 weight percent of an additional component in admixture with said polymer component and said halogenated aromatic hydrocarbon, said additional component being selected from the group consisting of wax and monohydroxy alcohol melting above about 120° F.

12. A selective plugging process for temporarily sealing the hydrocarbon flow channels and permanently sealing the water flow channels of subterranean formations penetrated by a well bore comprising injecting a liquid suspension of hydrocarbon-soluble, water-insoluble particles of a homogeneous solid mixture comprising between about 10 and about 50 weight percent of a polymer component and a halogenated aromatic hydrocarbon melting above about 120° F. into said well bore under sufficient pressure to cause said particles to enter said flow channels of said formation and to cause said flow channels to become plugged with said particles.

13. The method defined in claim 12 wherein said homogeneous solid mixture contains between about 5 and about 40 weight percent of an additional component in admixture with said polymer component and said halogenated aromatic hydrocarbon, said additional component being selected from the group consisting of wax and monohydroxy alcohol melting above about 120° F.

14. A method of completing a well bore drilled into a subterranean formation comprising circulating a completion fluid from the surface to the drilling zone in said formation during the drilling operation and returning to the surface at least a portion of said completion fluid, said completion fluid comprising a pumpable carrier medium having suspended therein particles of a homogeneous solid mixture comprising between about 10 and about 50 weight percent of a polymer component and a halogenated aromatic hydrocarbon having a melting point above about 120° F.

15. The method defined in claim 14 wherein said homogeneous solid mixture contains between about 5 and about 40 weight percent of an additional component in admixture with said polymer component and said halogenated aromatic hydrocarbon, said additional component being selected from the group consisting of wax and monohydroxy alcohol melting above about 120° F.

16. A method of producing fractures in a subterranean formation penetrated by a well bore comprising injecting a fracturing fluid into said well bore at a pressure and volume flow rate sufficient to produce a fracture in said formation, said fracturing fluid having suspended therein particles of a homogeneous solid mixture comprising between about 10 and about 50 weight percent of a polymer component and a halogenated aromatic hydrocarbon melting above about 120° F.

17. The method of claim 16 wherein said homogeneous solid mixture contains between about 5 and about 40 weight percent of an additional component in admixture with said polymer component and said halogenated aromatic hydrocarbon, said additional component being selected from the group consisting of wax and monohydroxy alcohol melting above about 120° F.

18. The method of producing fractures in a subterranean formation penetrated by a well bore comprising:
fracturing said formation by injecting a fracturing fluid into said well bore at a pressure and volume flow rate sufficient to produce a fracture in said formation; and
propping said fracture by depositing therein a mixture of particulate propping agents comprising particles insoluble in earth hydrocarbons and particles of a homogeneous solid mixture soluble in earth hydrocarbons comprising between about 10 and about 50 weight percent of a polymer component and a halogenated aromatic hydrocarbon melting above about 120° F.

19. The method defined in claim 18 wherein said mixture of particulate propping agents contains an equal volume of said particles insoluble in earth hydrocarbons and said particles soluble in earth hydrocarbons, and wherein said particulate mixture is deposited in said fracture by injecting a suspension of said particles in a carrier liquid through said well bore and into said formation, said suspension having an initial particle content of at least ½ pound of solid propping agent mixture per gallon of liquid, and whereupon the solid mixture content of said liquid injected into said well bore is increased to not more than about 12 pounds of solid particles per gallon of liquid.

20. The method defined in claim 18 wherein said homogeneous solid mixture contains between about 5 and about 40 weight percent of an additional component in admixture with said polymer component and said halogenated aromatic hydrocarbon, said additional component being selected from the group consisting of wax and monohydroxy alcohol melting above about 120° F.

21. A method of producing fractures in a subterranean formation penetrated by a well more comprising:
fracturing said formation by injecting a fracturing fluid into said well bore at a pressure and volume flow rate sufficient to produce a fracture in said formation;
propping said fracture by depositing therein a solid particulate propping agent to maintain said fracture open when said fracturing fluid pressure is released; and
sealing said propped fracture by depositing therein particles of a homogeneous solid mixture comprising between about 10 and about 50 weight percent of a polymer component and a halogenated aromatic hydrocarbon melting above about 120° F. injected through said well bore and into said fracture as a suspension in a carrier liquid.

22. The method defined in claim 21 wherein said homogeneous solid mixture contains between about 5 and about 40 weight percent of an additional component in admixture with said polymer component and said halogenated aromatic hydrocarbon, said additional component being selected from the group consisting of wax and monohydrdoxy alcohol melting above about 120° F.

23. The method defined in claim 21 including the additional steps of repeating said fracturing, propping and plugging steps to form a plurality of fractures in said subterranean formation.

24. A method of producing fractures in a subterranean formation penetrated by a well bore which comprises:
plugging naturally occurring fractures and flow channels in said formation by injecting through said well bore and into said fractures and flow channels a carrier liquid having suspended therein plugging particles of a substantially spherical shape and a size within the range passing a number 6 and being retained on a number 100 U.S. Standard sieve, said particles being a homogeneous solid mixture comprising between about 10 and about 50 weight percent of a polymer component and a halogenated aromatic hydrocarbon melting above about 120° F.;
fracturing said formation by injecting an initial portion of a fracturing fluid through said well bore and into said formation at a pressure and volume flow rate sufficient to produce a fracture in said formation;
propping said fracture by injecting a second portion of said fracturing fluid through said well bore and into said formation, said second portion of said fracturing fluid having suspended therein at least about ½ pound of a solid propping agent mixture per gallon of fluid, said propping agent mixture comprising about 50 volume percent of particles insoluble in earth hydrocarbons and about 50 volume percent of substantially spherical shaped particles soluble in earth hydrocarbons which comprise a homogeneous solid mixture having a composition within the range of said plugging particle composition and a size within the range passing a number 6 and being retained on a number 20 U.S. Standard sieve; and
increasing said addition of propping agent mixture to an amount not exceeding 12 pounds of solid propping agent per gallon of fluid.

25. A composition for injection into an earth formation which comprises particles of a homogeneous solid mixture comprising a polymer component and a halogenated aromatic hydrocarbon selected from the group consisting of halogenated benzenes melting above about 120° F. and halogenated naphthalenes melting above about 120° F.

26. The composition defined in claim 25 wherein said polymer component content of said solid particles is between about 10 and about 50 weight percent.

27. The composition defined in claim 25 wherein said polymer component is selected from the group consisting of (1) addition polymers of olefins having been two and four carbon atoms, (2) copolymers of an olefin having between two and four carbon atoms and an alkyl acrylate containing not more than four carbon atoms in the alkyl group, (3) copolymers of an olefin having between two and four carbon atoms and an ester formed by the reaction of butenic acid and an alcohol having no more than four carbon atoms, and (4) copolymers of olefins having between two and four carbon atoms and an ester formed by the reaction of acetic acid and an unsaturated alcohol having no more than four carbon atoms.

28. The composition defined in claim 25 wherein said polymer component is selected from the group consisting of polyethylene, polypropylene, copolymer ethylene and vinyl acetate, and copolymer ethylene and methyl methacrylate.

29. The composition defined in claim 28 wherein said polymer component is a mixture of two or more materials selected from said group.

30. The composition defined in claim 25 wherein said homogenous solid mixture contains between about 5 and about 40 weight percent of an additional component in admixture with said polymer component and said halogenated aromatic hydrocarbon, said additional component being selected from the group consisting of wax and monohydroxy alcohol melting above about 120° F.

31. The composition defined in claim 25 wherein said halogenated aromatic hydrocarbon is selected from those materials listed in Table I.

32. The composition defined in claim 25 wherein said halogenated aromatic hydrocarbon is p-dichlorobenzene.

33. A composition for injection into an earth formation comprising particles of a homogeneous solid mixture comprising a polymer component and a halogenated aromatic hydrocarbon melting above about 120° F. suspended in a carrier liquid.

34. The composition of claim 33 wherein said particles are within the size range passing a number 6 and being retained on a number 100 U.S. Standard sieve, and wherein the suspension of said solid particles in said carrier fluid contains between about ½ pound and about 12 pounds of solid particles per gallon of carrier fluid.

References Cited

UNITED STATES PATENTS

| | | | |
|---|---|---|---|
| 3,089,542 | 5/1963 | Kolodny | 166—42 |
| 3,145,773 | 8/1964 | Jorda | 166—33 X |
| 3,149,673 | 9/1964 | Pennington | 166—42 |
| 3,193,011 | 7/1965 | Richard | 166—33 |
| 3,208,520 | 9/1965 | Gilchrist | 166—11 |
| 3,277,046 | 10/1966 | Listner | 260—33.8 X |

OTHER REFERENCES

Wakeman: The Chemistry of Commercial Plastics, 1947, Reinhold Publishing Corp., New York, N.Y., pp. 84, 85, 769–773 relied on.

CHARLES E. O'CONNELL, *Primary Examiner.*

STEPHEN J. NOVOSAD, *Examiner.*